United States Patent
Wong et al.

(10) Patent No.: US 11,190,546 B2
(45) Date of Patent: Nov. 30, 2021

(54) SECURE FAILSAFE APPARATUS

(71) Applicant: QDroid Inc., Seattle, WA (US)

(72) Inventors: Ivy Wong, Sammamish, WA (US); Ella Xue, Flushing, NY (US)

( * ) Notice: Subject to any disclaimer, the term of this patent is extended or adjusted under 35 U.S.C. 154(b) by 0 days.

(21) Appl. No.: 16/428,902

(22) Filed: May 31, 2019

(65) Prior Publication Data

US 2020/0382558 A1     Dec. 3, 2020

(51) Int. Cl.
*H04L 29/06*     (2006.01)
*H04L 12/28*     (2006.01)

(52) U.S. Cl.
CPC ............. *H04L 63/20* (2013.01); *H04L 63/12* (2013.01); *H04L 12/28* (2013.01)

(58) Field of Classification Search
CPC ........................................................ H04L 63/20
USPC ............................................................. 726/3
See application file for complete search history.

(56) References Cited

U.S. PATENT DOCUMENTS

| | | | |
|---|---|---|---|
| 5,566,339 A | 10/1996 | Perholtz | |
| 6,907,542 B2 | 6/2005 | Barthel | |
| 8,291,483 B2 | 10/2012 | Krell | |
| 8,556,991 B2 * | 10/2013 | Tarkhanyan | ............ G06F 21/88 |
| | | | 726/35 |
| 8,793,774 B1 * | 7/2014 | Kumar | ............ H04L 63/20 |
| | | | 726/3 |
| 8,812,875 B1 * | 8/2014 | Melvin | ............ G06F 21/78 |
| | | | 713/193 |
| 9,794,286 B2 | 10/2017 | Otsuka | |
| 9,892,293 B1 * | 2/2018 | Wade | ............ G06K 7/10277 |
| 10,211,486 B2 | 2/2019 | Wong | |
| 2003/0032407 A1 * | 2/2003 | Mages | ............ H04M 3/16 |
| | | | 455/411 |
| 2006/0230459 A1 * | 10/2006 | Lam | ............ H04N 7/1675 |
| | | | 726/26 |
| 2010/0032478 A1 * | 2/2010 | Deng | ............ G01N 35/00663 |
| | | | 235/380 |
| 2011/0162076 A1 * | 6/2011 | Song | ............ G06F 21/554 |
| | | | 726/26 |
| 2012/0115431 A1 * | 5/2012 | Kim | ............ H04W 4/90 |
| | | | 455/404.1 |
| 2013/0019304 A1 * | 1/2013 | Cai | ............ H04W 52/0264 |
| | | | 726/16 |
| 2014/0379900 A1 * | 12/2014 | Dasgupta | ............ H04L 41/145 |
| | | | 709/224 |
| 2015/0278558 A1 * | 10/2015 | Priev | ............ G06F 21/88 |
| | | | 726/35 |

(Continued)

*Primary Examiner* — Harris C Wang
(74) *Attorney, Agent, or Firm* — RC Trademark Company

(57) ABSTRACT

According to some embodiments, an electronic device can implement a failsafe action. The system comprises a processor and a computer-readable medium comprising processor executable instructions, that when executed by the processor, performs a method, the method comprises receiving a first antidote message within a first time interval. Based on receiving the first antidote message, continuing normal operation of the electronic device is continued. The electronic device waits for reception of a second antidote message within a second time interval. A determination is made that the second antidote message was not received within the second time interval. In response to determining that the second antidote message was not received, implementing a first failsafe action.

20 Claims, 3 Drawing Sheets

(56) References Cited

U.S. PATENT DOCUMENTS

| | | | |
|---|---|---|---|
| 2016/0149271 A1* | 5/2016 | Horito | H01M 10/425 320/112 |
| 2017/0116432 A1* | 4/2017 | Minoli | G06F 21/6218 |
| 2017/0149833 A1* | 5/2017 | Ngo | H04L 63/20 |
| 2018/0139196 A1 | 5/2018 | Yoshii | |
| 2019/0294722 A1* | 9/2019 | Mohan | G06F 16/212 |

* cited by examiner

200

Receive a first antidote message within a first time interval  210

Continue normal operation of the electronic device based on receiving the first antidote message  220

Wait for reception of a second antidote message within a second time interval  230

Determine that the second antidote message was not received within the second time interval  240

Implement a first fail safe action in response to determining that the second antidote message was not received  250

FIG. 2

SECURE FAILSAFE APPARATUS

BACKGROUND

Networkable devices (e.g., phones, storage devices, sensors, IoT devices, routers, network servers, a robot or large-scale machines) are normally connected via a network or are in communication with another device. Devices that are removed from the network, or can't communicate with the network cannot maintain connectivity with the network or the other devices on the network. In this situation, it may not be possible to send commands to disable the devices or erase the data in the devices. If a networkable device is removed from a network (e.g., the device is stolen), the data on that device could be used to hack the network or steal personal information about users or other devices on the network (e.g., stealing routers, database servers, flash drives, etc.).

It would therefore be desirable to provide a system to prevent networkable devices from being compromised and being used to cause further harm to users or network devices.

SUMMARY

Some embodiments described herein relate to an electronic device that can implement a failsafe action to reduce further harm to users or network devices in a case that the electronic device is removed from a network. The electronic device comprises a processor and a computer-readable medium comprising processor executable instructions, that when executed by the processor, performs a method. The method comprises receiving a first antidote message within a first time interval. Based on receiving the first antidote message, continuing normal operation of the electronic device. The electronic device waits for reception of a second antidote message within a second time interval. A determination is made that the second antidote message was not received within the second time interval. In response to determining that the second antidote message was not received, a first failsafe action is implemented.

BRIEF DESCRIPTION OF THE DRAWINGS

FIG. 2 illustrates a method in accordance with some embodiments.

DETAILED DESCRIPTION

Figure 1:
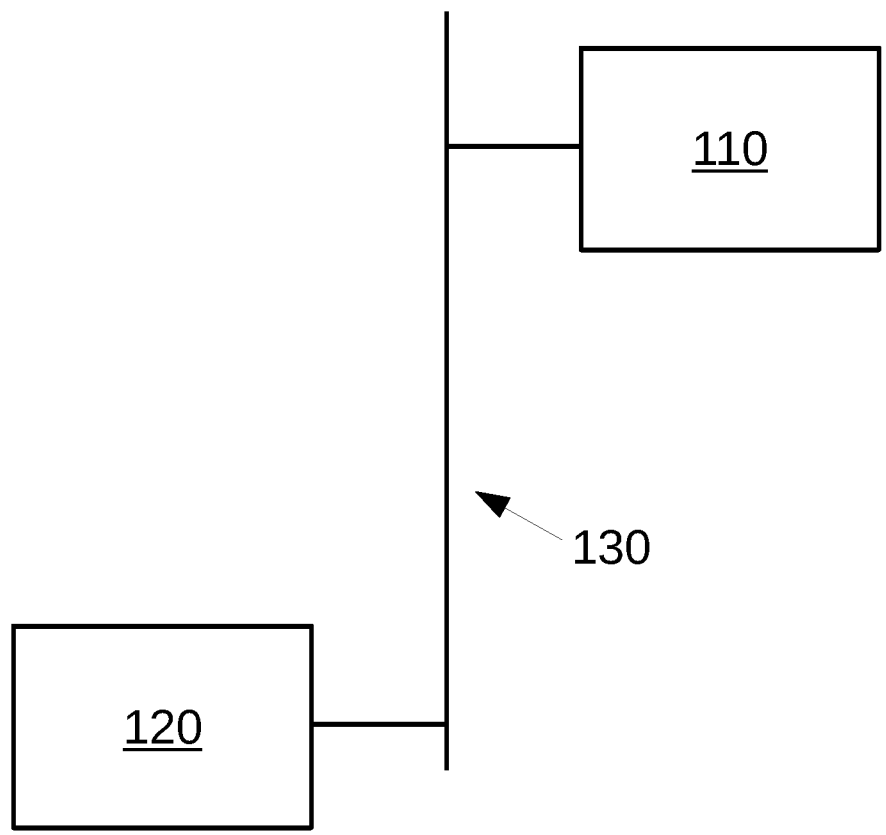
FIG. 1 illustrates a network in accordance with some embodiments.

In the following detailed description, numerous specific details are set forth in order to provide a thorough understanding of the embodiments. However, it will be understood by those of ordinary skill in the art that the embodiments may be practiced without these specific details. In other instances, well-known methods, procedures, components and circuits have not been described in detail so as not to obscure the embodiments.

The present embodiments relate to a failsafe system for electronic devices (e.g., phones, storage devices, sensors, IoT devices, routers, network servers, a robot or large-scale machines) that are normally connected via a network or are in communication with another device. In some embodiments, an electronic device may receive a module comprising processor executable steps to implement the embodiments described herein to initiate failsafe actions on the electronic device. The present embodiments may be implemented as either hardware (e.g., a chip) or as software modules to exiting products. For example, a third party may include software modules for implementing failsafe methods in a software library and an electronic device may implement the failsafe methods by calling one or more APIs from the software library. For example, as with a mesh network, all devices on the mesh network may simply receive and verify a message that is broadcasted over the mesh network. All devices on the network that can receive and verify the broadcast message may maintain normal operations. Devices removed from the network, or devices that can't communicate with the network may not be able to receive and verify these messages. These devices that can't communicate with the network or can't verify the message may trigger a failsafe action. In some embodiments, the failsafe might trigger if the transmitter of the message is not a verified transmitter of the message (e.g., authentication of the message fails or the message comes from an IP address that is not approved by the receiving device). In some embodiments, the failsafe might trigger if one or more conditions embedded in the antidote message are not satisfied. For example, the antidote message may comprise a specific serial number pattern or a device type identification which must be matched at the local device for an antidote message to be confirmed and accepted. In another example, the antidote message may indicate a specific device status to be matched, such as the operation currently being executed, current memory content or a CPU register value, input or output power, as well as detectable environmental data (e.g., temperature).

The present embodiments further relate to a hard or soft coded failsafe system that monitors for predefined events (e.g., the electronic device is out of the signal reception range, predefined messages are not received and/or cannot be verified, or the device stops transmitting) and if one, or more, of these predefined events occurs, one or more failsafe actions may be performed.

Now referring to FIG. 1, an embodiment of a network system 100 is illustrated. As illustrated in FIG. 1, a first device 110 and a second device 120 may be electrically coupled to a network 130. The network 130 may comprise any wired or wireless network that may be used for communication purposes between electronic devices. For example, the network 130 may comprise, but is not limited to, a wired and/or wireless mesh network, LAN, MAN, or WAN.

For purposes of illustration, the first device 110 may comprise an electronic device such as, but not limited to, a phone, a storage device, an IoT device, a router, or a network server. Also, for purposes of illustration, the second device 120 may function as a master computer and may comprise, but is not limited to, a server, a signal station, a hub, a switch, a controller or a router. In a case that the first device 110 is stolen, a thief might have removed the first device 110 from its original location in an attempt to steal data stored on the first device 110 which could cause a security breach to a network or personal information. In some embodiments, the thief might attempt to install a malicious software application (e.g., a virus) on the first device 110 and then and put the first device 110 back without anyone being aware of the first device 110 being absent from the network 130. In some embodiments, the first device 110, such as a laptop or a flash drive, may simply be lost by a user leaving it available for anyone to take possession of the first device 110. In one example, the first device 110, may comprise a robot or large scale machine that may lose its connection to a control center and the first device 110 may become out-of-control or may perform an unexpected behavior. In another example, the first device 110, may comprise a weapon (or motor vehicle), and the first device 110 may be lost or stolen and may be used to harm an owner of the first device 110 or may be used for other criminal activities.

The present embodiments described herein further relate to the first device 110 periodically receiving an antidote message from the second device 120. The antidote message may comprise a message that is received by the first device 110 to indicate to the first device 110 that it should not implement a failsafe action. Failsafe actions may comprise at least one of pausing a current operation of the first device 110 for a pre-determined amount of time, stopping the current operation of the first device 110, resetting the electronic device to a preset or factory state, clearing partial or all data stored in the first device 110, disabling specific functionalities or features or the first device 110, initiating a self-destruct sequence, reducing current and/or voltage associated with the electronic device, and/or sending a notification to an authorized user.

Failure to receive an antidote message at the first device 110 within a pre-defined time period may instruct the first device 110 to implement a failsafe action as will be described in more detail with respect to FIG. 2.

In an alternate embodiment, a third device (not shown in FIG. 1) may be placed or inserted into the first device 110 to function as a failsafe implementor and an antidote message receiver. For example, the third device may comprise a card or chip (e.g., a non-transitory computer readable medium) that is inserted into the first device 110. This card or chip may comprise the logic and receiver to implement the embodiments described herein. In another alternate embodiment, the first device 110 may function as a failsafe implementor and an antidote message receiver for the second device 120. For example, the first device 110 may be used to implement failsafe actions on device 120 in response to not receiving an antidote message at 110. In other words, the failsafe action may be carried out at a different device than the device receiving, or not receiving, the antidote message. In this embodiment, the first device 110 may send commands to the second device 120 to implement the failsafe action.

Now referring to FIG. 2, a method 200 that might be performed by an electronic device, such as the first device 110, described with respect to FIG. 1, is illustrated according to some embodiments. The method described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 200 may relate to implementing a failsafe action on an electronic device based on a failure to receive an antidote message. Now referring to 210, a first antidote message is received at an electronic device within a first time interval. The time interval may be a user pre-defined setting, or a system defined time interval set by a master computer, such as second device 120. The antidote message may comprise information that identifies a known sender of the antidote message, a time stamp, a list of conditions to be satisfied, and a hash code that may be used for verification by the electronic device. A system defined time interval may change based on current system usage and available bandwidth. In some embodiments, a sender of the antidote message (e.g., the master computer, router, server, etc.) may send a global time interval update message to periodically adjust the system defined time interval. For example, and in the case of a mesh network, the master computer may update the system defined time intervals across an entire mesh based on a current use and potential risk factor (e.g., a determination of risk may be defined by a system operator) associated with the mesh network.

For purposes of illustrating features of the present embodiments, some simple examples will now be introduced and referenced throughout the disclosure. Those skilled in the art will recognize that these examples are illustrative and are not limiting and are provided purely for explanatory purposes. In some embodiments, a system may default to send antidote messages every 5 minutes. Thus, in this example the system defined time interval is defined as every 5 minutes. Therefore, the electronic device may set a counter to determine if an antidote message is received within the five-minute period.

Next, at 220, normal operation of the electronic device is continued based on receiving the first antidote message. Thus, in the present example, reception of the first antidote message may reset a timer in the electronic device to wait for a next antidote message. The timer may be integral to a processor located within the electronic device. In some embodiments, the timer may be separate from the processor. In some embodiments, the first antidote message may be validated prior to continuing normal operation of the electronic device. Validation may be based on one or more of decoding a hash code within the antidote message, symmetric-key cryptography, and public-key cryptography. In some embodiments, the first antinode message may contain a list of required conditions that must be satisfied for validation of the first antidote message. For example, conditions may comprise, but are not limited to, the first antidote message coming from a specific device, a pattern of a device serial number of the sending machine or the electronic device (e.g., first device 110), the device type, current status of the device (e.g., current, voltage, temperature, operation/state), an operation currently being executed, current memory content or a CPU register value, input and/or output power, or external environmental data. For example, devices contained within a server room may experience a limited range of temperatures (e.g., between 65 and 68 degrees with little fluctuation). This temperature range may act as an indication that a device is in its proper location. Therefore, if a device is moved to a location that does not have a similar temperature range (e.g., a car, a car trunk) the device may not validate an antidote message since a condition (e.g., temperature range) has not been met. Similarly, if the master computer indicates an external temperature in the antidote message that is out of range from what the receiving machine is experiencing, the antidote message may not be validated.

Once normal operation continues, the electronic device may wait for reception of a second antidote message within a second time interval at 230. While waiting for the second antidote message, the electronic device may continue to operate normally. At the end of the second time interval, the timer may indicate to the processor that the second time interval has expired. Accordingly, a determination may be made, by a processor, that the second antidote message was not received within the second time interval at 240. Once the processor receives an indication from the timer that the second time interval has expired, a first failsafe action may be implemented in response to determining that the second antidote message was not received at 250.

The first failsafe action may comprise at least one of pausing a current operation of the electronic device for a pre-determined amount of time, stopping the current operation of the electronic device, resetting the electronic device to a preset or factory state, clearing partial or all data stored in the electronic device, disabling specific functionalities or features or the electronic device, initiating a self-destruct sequence, reducing current and/or voltage associated with the electronic device, and/or sending a notification to an authorized user.

Continuing with the above example, an antidote message was not received within a next 5-minute period. The timer may then indicate to the processor that the 5-minute time period has expired. The processor may then initiate a failsafe action based on a pre-defined list of failsafe actions that should be taken after one antidote message has been missed. In some embodiments, determining a failsafe action may be based on a pre-defined list of actions that are based on a number of antidote messages that have been missed. For example, implementing the first failsafe action in response to determining that the second antidote message was not received may further comprise determining a threshold number of antidote messages that have not been received during expected time intervals. In some embodiments, the electronic device may not initiate a failsafe action after missing only one antidote message. In this embodiment, a preset number of missed, or consecutively missed, antidote messages may trigger a failsafe action. For example, the preset number may comprise 3 consecutive missed antidote messages to allow for systems to be rebooted or updated without triggering a failsafe action.

In some embodiments, it may be determined that a third antidote message was not received within a third time interval. In other words, at least two antidote messages were not received during their respective time intervals (e.g., either consecutive or non-consecutive time intervals). In response to the third antidote message not being received within a third time interval, a second failsafe action may be implemented where the second failsafe action is different than the first failsafe action. In other words, a first failsafe action may be implemented in response to missing the second antidote message. This first failsafe action may be a simple action that merely temporarily stops a device from operating while the second failsafe action may be more severe such as erasing data or permanently disabling a device from operating.

In some embodiments, prior to implementing the first failsafe action, the electronic device may transmit a request for an antidote message in response to determining that the second antidote message was not received within the second time interval. For example, after the timer indicates to the processor that a time frame to receive an antidote message has expired, the processor may initiate a request for an antidote message that may then be transmitted to the device that sends antidote messages. This may be useful when an antidote message is missed due to some network anomaly. However, if the request is not answered within a preset period of time, the first failsafe action may then be implemented.

In another embodiment, prior to implementing the first failsafe action, the electronic device may transmit a request to extend the second time interval for the second antidote message. For example, a user may realize that a system is going to be rebooted or updated with new software so the user may request a temporary longer time period. In the case when a request to extend the second time interval for the second antidote message was transmitted, a denial to the request to extend the second time interval may be received. In other words, a master computer may deem that an extension is not permitted based on current system needs or a pre-defined security policy at the master computer. Therefore, a denial may then be sent to the electronic device. However, if the current system needs or the pre-defined security policy at the master computer may allow an increase in a time period, a command to extend a time interval for an antidote message may be received at the electronic device. In some embodiments, the command to extend a time interval for an antidote message may be received without having to have sent a request.

In some embodiments, as in the case where the electronic device comprises a smart battery, that can increase or decrease its voltage and current, the first failsafe action may comprise (1) temporarily or permanently reducing current or voltage of a battery within the electronic device to stop the electronic device from functioning or (2) increasing the current or voltage of the battery to cause electrical components within the device to permanently stop functioning (e.g., permanently damage electrical components). A smart battery may comprise a voltage and/or current controller embedded within the battery that receives instructions from the processor to instruct the battery to change an output of the battery. Changing an output of a battery may prevent an electronic device from operating. For example, some electronic devices may comprise components that are sensitive to changes in voltage and/or current. Thus, for example, the battery may increase voltage from 5 volts to 30 volts to cause the components to "fry" or permanently cease functioning.

Figure 3:
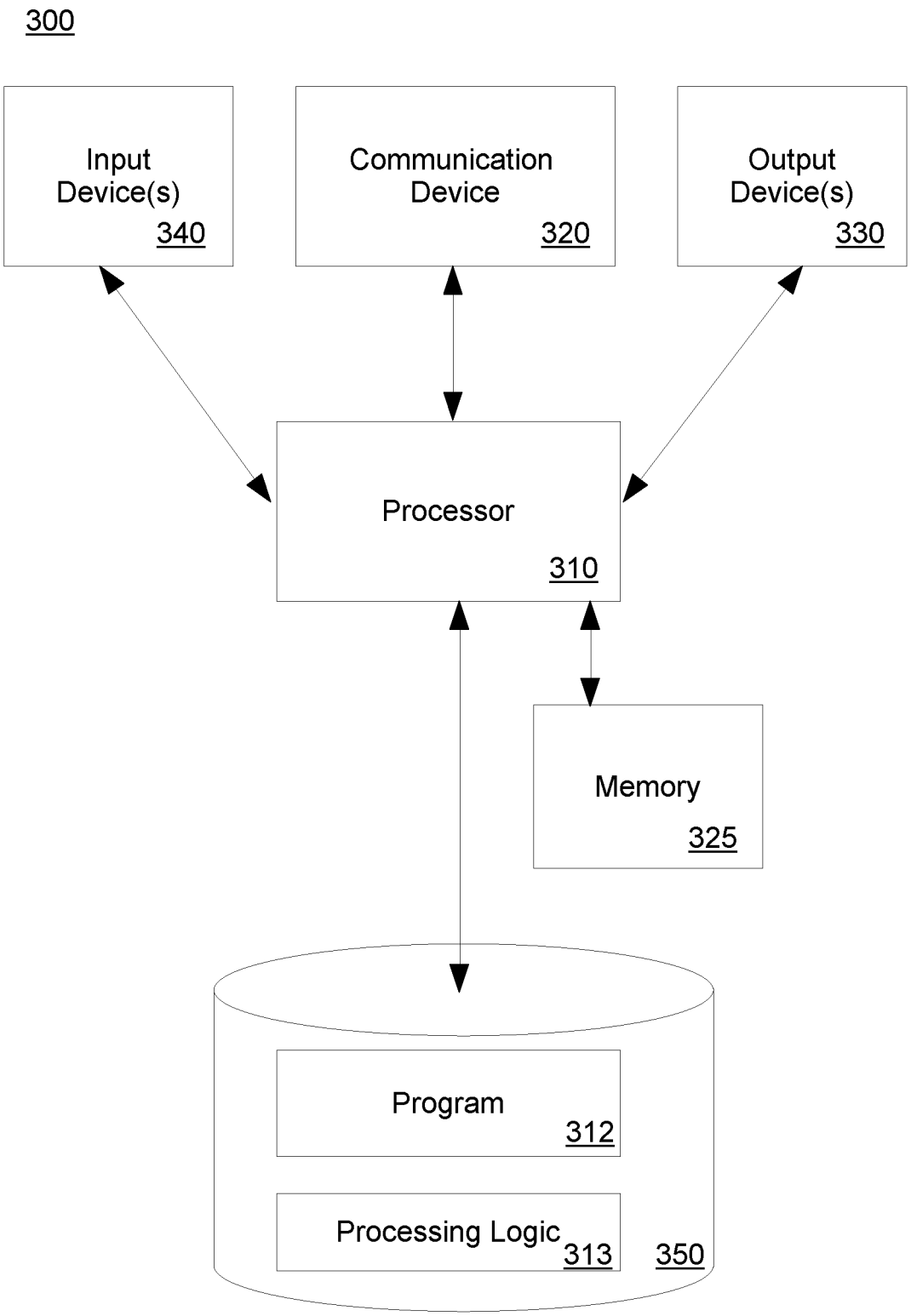
FIG. 3 illustrates an electronic device according to some embodiments.

Note the embodiments described herein may be implemented using any number of different hardware configurations. For example, FIG. 3 illustrates an electronic device 300 that may be, for example, associated with the system 100 of FIG. 1. The electronic device 300 may provide a technical and commercial advantage by being able to implement a failsafe action to reduce the changes of the device itself or the data stored on the electronic device from being compromised.

The electronic device 300 may comprise a processor 310 ("processor"), such as one or more commercially available Central Processing Units (CPUs) in the form of one-chip microprocessors, coupled to a communication device 320 configured to communicate via a communication network (not shown in FIG. 3). The communication device 320 may be used to communicate, for example, with one or more machines on a network. The electronic device 300 further includes an input device 340 (e.g., a mouse and/or keyboard to enter information about failsafe actions or system time intervals) and an output device 330 (e.g., to output and display the data and/or alerts).

The processor 310 also communicates with a memory 325 and storage device 350 that stores data 313. The storage device 350 may comprise any appropriate information storage device, including combinations of magnetic storage devices (e.g., a hard disk drive), optical storage devices, mobile telephones, and/or semiconductor memory devices. The storage device 350 may store a program 312 and/or processing logic 313 for controlling the processor 310. The processor 310 performs instructions of the programs 312, 313, and thereby operates in accordance with any of the embodiments described herein. For example, the processor 310 may receive data from a timer integral to the processor 310 and may institute a failsafe action via the instructions of the programs 312 and processing logic 313.

The programs 312, 313 may be stored in a compiled, compressed, uncompiled and/or encrypted format or a combination. The programs 312, 313 may furthermore include other program elements, such as an operating system, a database management system, and/or device drivers used by the processor 310 to interface with peripheral devices.

As will be appreciated by one skilled in the art, the present embodiments may be embodied as a system, method or computer program product. Accordingly, the embodiments described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments described herein may take the form of a computer program product embodied in one or more computer readable medium(s) having computer readable program code embodied thereon.

The process flow and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. An electronic device, comprising:
   a processor; and
   a non-transitory computer-readable medium comprising processor executable instructions, that when executed by the processor, performs a method, the method comprising:
   receiving a first antidote message within a first time interval at the electronic device where the first antidote message is transmitted from an external second device;
   validating the received first antidote message based on (i) decoding the antidote message and (ii) determining if a temperature indicated in the antidote message matches a known temperature of the external second device's environment;
   continuing normal operation of the electronic device based on receiving the first antidote message and the validation;
   waiting for reception of a second antidote message from the external second device within a second time interval;
   determining that the second antidote message was not received from the external second device within the second time interval;
   prior to implementing a first failsafe action, and based on an indication from a timer that a time frame to receive an antidote message has expired, transmitting, via the electronic device, and to the external second device, a request for an antidote message in response to determining that the second antidote message was not received within the second time interval; and
   based on determining that the request was not answered within a preset period of time, implementing, at the electronic device, the first failsafe action in response to determining that the second antidote message was not received from the external second device.

2. The electronic device of claim 1, wherein the first failsafe comprises at least one of pausing a current operation of the electronic device for a pre-determined amount of time, stopping the current operation of the electronic device, resetting the electronic device to a preset or factory state, clearing partial or all data stored in the electronic device, disabling specific functionalities or features or the electronic device, initiating a self-destruct sequence, reducing current and/or voltage associated with the electronic device, and sending a notification to an authorized user.

3. The electronic device of claim 1, wherein the first failsafe action comprises sending an instruction to a battery located on the electronic device to reduce current or voltage of a battery within the electronic device to stop the electronic device from functioning in response to the instruction.

4. The electronic device of claim 1, further comprising validating the first antidote message prior to continuing normal operation of the electronic device.

5. The electronic device of claim 1, wherein implementing the first failsafe action in response to determining that the second antidote message was not received further comprises determining that a threshold number of antidote messages, that is greater than one, have not been received during expected time intervals.

6. The electronic device of claim 1, wherein the method further comprises: prior to implementing the first failsafe action, transmitting a request to extend the second time interval for the second antidote message.

7. The electronic device of claim 6, wherein the method further comprises:
prior to implementing the first failsafe action, receiving a denial to the request to extend the time interval for an antidote message based on current system needs or a pre-defined security policy at the external second device.

8. The electronic device of claim 1, wherein the method further comprises: prior to implementing the first failsafe action, receiving a command to extend a time interval for an antidote message.

9. The electronic device of claim 1, wherein the method further comprises: determining that a third antidote message was not received within a third time interval; and implementing a second failsafe action in response to determining that the third antidote message was not received where the second failsafe action is different than the first failsafe action.

10. An electronic device, comprising:
a processor; and
a non-transitory computer-readable medium comprising processor executable instructions, that when executed by the processor, performs a method, the method comprising:
receiving a first antidote message within a first time interval at the electronic device where the first antidote message is transmitted from an external second device;
validating the received first antidote message based on determining if a temperature indicated in the antidote message matches a known temperature of the external second device's environment;
continuing normal operation of the electronic device based on receiving the first antidote message and the validation;
waiting for reception of a second antidote message from the external second device within a second time interval;
determining that the second antidote message was not received within the second time interval from the external second device;
prior to implementing a first failsafe action, and based on an indication from a timer that a time frame to receive an antidote message has expired, transmitting, via the electronic device, and to the external second device, a request for an antidote message in response to determining that the second antidote message was not received within the second time interval; and
based on determining that the request was not answered within a preset period of time, implementing, at the electronic device, the first failsafe action in response to determining that the second antidote message was not received from the external second device.

11. The electronic device of claim 10, wherein the first failsafe comprises at least one of pausing a current operation of the electronic device for a pre-determined amount of time, stopping the current operation of the electronic device, resetting the electronic device to a preset or factory state, clearing partial or all data stored in the electronic device, disabling specific functionalities or features or the electronic device, initiating a self-destruct sequence, reducing current and/or voltage associated with the electronic device, and sending a notification to an authorized user.

12. The electronic device of claim 10, wherein the non-transitory computer readable medium comprises a card or chip that is inserted into the electronic device.

13. The electronic device of claim 10, wherein implementing the first failsafe action in response to determining that the second antidote message was not received further comprises determining a threshold number of antidote messages, that is greater than one, that have not been received during expected time intervals.

14. The electronic device of claim 10, wherein the method further comprises:
prior to implementing the first failsafe action, transmitting a request to extend the second time interval for the second antidote message.

15. The electronic device of claim 14, wherein the method further comprises:
prior to implementing the first failsafe action, receiving a denial to the request to extend the time interval for an antidote message.

16. The electronic device of claim 10, wherein the method further comprises:
prior to implementing the first failsafe action, receiving a command to extend a time interval for an antidote message.

17. The electronic device of claim 10, wherein the method further comprises:
determining that a third antidote message was not received within a third time interval; and
implementing a second failsafe action in response to determining that the third antidote message was not received where the second failsafe action is different than the first failsafe action and wherein the conditions defined in the first antidote message further comprise at least one of matching a specific serial number pattern, a device type identification, a specific device status, an operation currently being executed, current memory content, and a CPU register value.

18. A system, comprising:
a first electronic device; and
a second electronic device comprising:
a processor; and
a non-transitory computer-readable medium comprising processor executable instructions, that when executed by the processor, performs a method, the method comprising:
receiving a first antidote message within a first time interval at the second electronic device at the electronic device where the first antidote message is transmitted from an external second device;
validating the received first antidote message based on determining if a temperature indicated in the antidote message matches a known temperature of the external second device's environment;
continuing normal operation of the electronic device based on receiving the first antidote message and the validation;
waiting for reception of a second antidote message from the external second device within a second time interval;
determining that the second antidote message was not received from the external second device within the second time interval;
transmitting a request to extend the second time interval for the second antidote message;

receiving a denial to the request to extend the time interval for the second antidote message;

prior to implementing a first failsafe action, and based on an indication from a timer that a time frame to receive an antidote message has expired, transmitting, via the electronic device, and to the external second device, a request for an antidote message in response to determining that the second antidote message was not received within the second time interval; and based on determining that the request was not answered within a preset period of time, implementing, at the electronic device, the first failsafe action in response to determining that the second antidote message was not received from the external second device.

19. The electronic device of claim 18, wherein (i) the first failsafe comprises at least one of pausing a current operation of the electronic device for a pre-determined amount of time, stopping the current operation of the electronic device, resetting the electronic device to a preset or factory state, clearing partial or all data stored in the electronic device, disabling specific functionalities or features or the electronic device, initiating a self-destruct sequence, reducing current and/or voltage associated with the electronic device, and sending a notification to an authorized user and (ii) implementing the first failsafe action in response to determining that the second antidote message was not received further comprises determining that a threshold number of antidote messages, that is greater than one, have not been received during expected time intervals.

20. The electronic device of claim 10, wherein validating the received first antidote message based on a temperature comprises (i) validating a temperature associated with the electronic device or (ii) validating a temperature associated with the external second device.

* * * * *